United States Patent [19]

Kingsley

[11] 4,409,624

[45] Oct. 11, 1983

[54] RASTER SCANNING APPARATUS

[75] Inventor: William Kingsley, Rochester, N.Y.

[73] Assignee: Xerox Corporation, Stamford, Conn.

[21] Appl. No.: 364,132

[22] Filed: Mar. 31, 1982

[51] Int. Cl.³ .................. H04N 1/04; G03G 15/28
[52] U.S. Cl. .................................... 358/285; 355/8; 358/293
[58] Field of Search ............ 358/285, 293, 213, 286; 355/8, 11, 49, 51, 66

[56] References Cited

U.S. PATENT DOCUMENTS

| | | | |
|---|---|---|---|
| 4,149,091 | 4/1979 | Crean et al. | 358/285 X |
| 4,150,873 | 4/1979 | Dali | 358/285 |
| 4,321,627 | 3/1982 | Hooker et al. | 358/285 X |

Primary Examiner—R. L. Moses
Attorney, Agent, or Firm—Frederick E. McMullen

[57] ABSTRACT

A raster input scanner incorporating a scanning array, a platen for supporting documents to be scanned, a lens, and an illuminator. The lens is supported for micro movement in close proximity to the array, such movement being imparted by a linear motor. In one embodiment, the illuminator comprises a stationary light source with oscillating mirror for sweeping a wedge-like beam of light across the platen in synchronism with movement of the lens to progressively illuminate the document being scanned. A park position is provided for the lens and illuminator and a document feeder provided to transport the document to be scanned across a scan slit provided in the platen in an alternate operating mode.

In a second embodiment, the illuminator comprises a lamp cavity reciprocable along a path parallel to the platen to progressively illuminate the platen.

12 Claims, 8 Drawing Figures

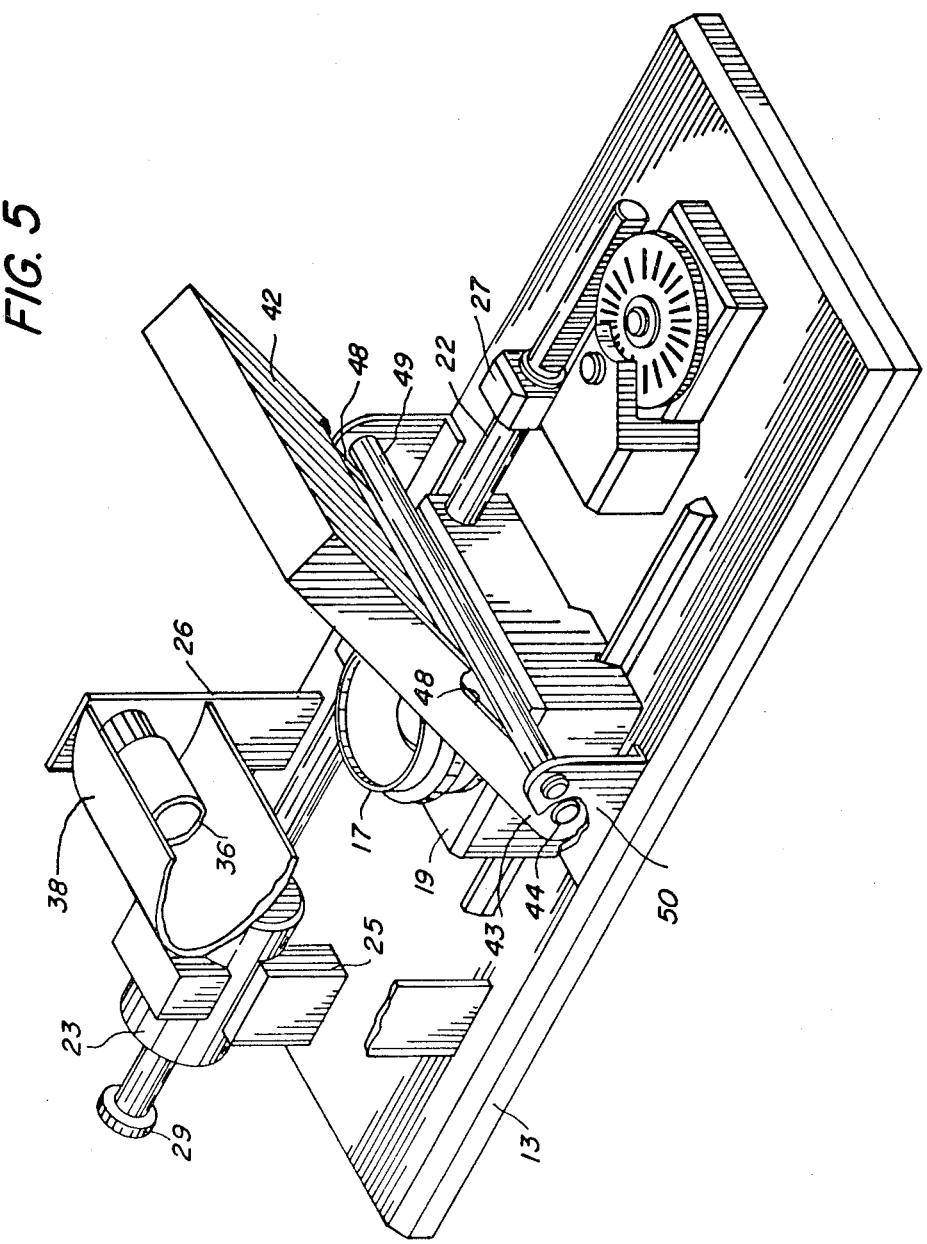

RASTER SCANNING APPARATUS

The invention relates to a raster input scanner, and more particularly to a raster input scanner having micro scan lens movement.

Copiers or reproduction machines utilize a light source to illuminate the document being copied with imaging lens to force the image rays onto the copying member. For example, in xerographic systems, the image rays generated by exposure of the original document to light expose a previously uniformly charged photoconductor, with the result that a latent electrostatic image of the document being copied is created. As understood by those familiar with the art, the latent image is thereafter developed and transferred from the photoconductor to a copy substrate material where the developed image is fixed as by fusing to form a permanent copy.

Similarly, in a raster input scanner, a light source is relied upon to illuminate the document being scanned. The image rays resulting from such illumination are focused by a lens onto the light sensitive elements of a self-scanned array which converts the light representing the document image to analog image signals. These signals may be then suitably processed, encoded, stored, transmitted, etc. in a manner known to those skilled in the art.

However, illumination systems for apparatus of the type described are expensive, both in terms of their initial cost and in terms of their power consumption, such systems requiring careful and often complex designs in order to obtain both the required level of illumination and illumination uniformity. And where as in a raster scanner the illumination system must provide a moving scanning beam, the problem is compounded not only due to the need to scan the beam across the document but also by the need to scan the imaging lens in synchronism with the scanning beam as well in order to maintain the image rays in focus with the array. Typically in the prior art, as exemplified by U.S. Pat. No. 3,419,327 issued on Dec. 31, 1968 to Mitsuru Oikawa et al, a so-called half rate scan system is used in these cases in which the lens is scanned at one half the rate at which the scanning beam is scanned. Obviously, where large size document originals are to be scanned, this requires movement of both the scanning beam and the lens through substantial distances requiring relatively complex and expensive drive systems.

The invention seeks to correct or at least alleviate the foregoing problems by providing a micro scanner having a transparent platen for supporting a document to be scanned; means forming a wedge-like beam of light, the dimension of the light beam being at least equal to the width of the document in a cross-scan direction; means for scanning the light beam along the platen in a scan direction substantially perpendicular to the cross-scan direction to illuminate the document on the platen line by line, the scan distance through which the light beam is moved being at least equal to the length of the document in the scan direction; at least one linear scanning array, the array being stationary; a lens interposed between the platen and the array for focusing document lines onto the array as the lines are illuminated by the light beam, the lens being positioned in close proximity to the array; and drive means for moving the lens in synchronism with the light beam, the drive means moving the lens at a fraction of the distance through which the light beam is moved whereby to maintain the document lines in focus with the array as the light beam is moved through the scan distance with only micro-like movement of the lens.

IN THE DRAWINGS:

FIG. 5 is an enlarged isometric view showing details of the search light-like scanning mechanism for the scanner shown in FIG. 1;

Figure 1:
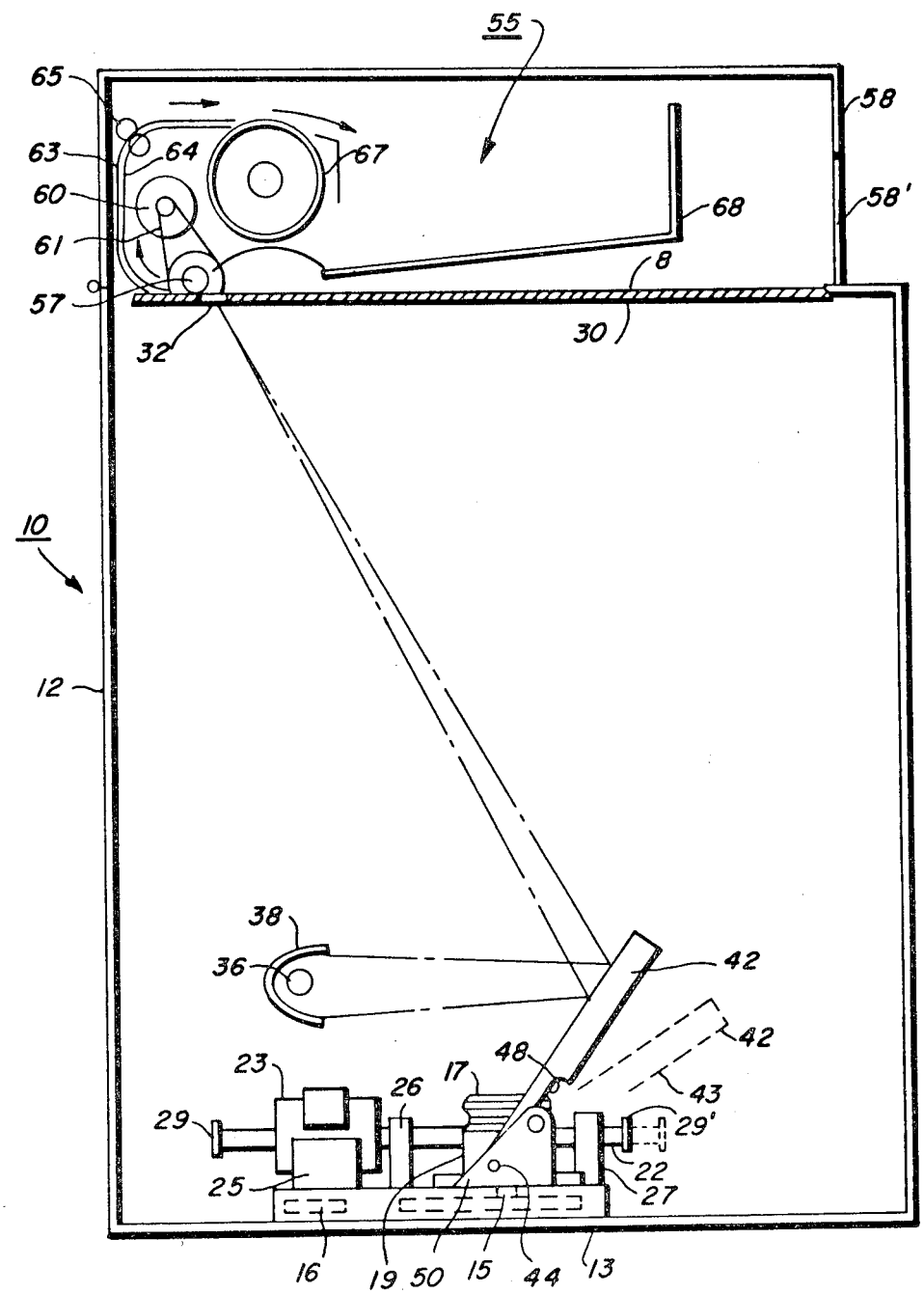
FIG. 1 is a side view in cross section showing the micro scanner of the present invention.
Figure 2:
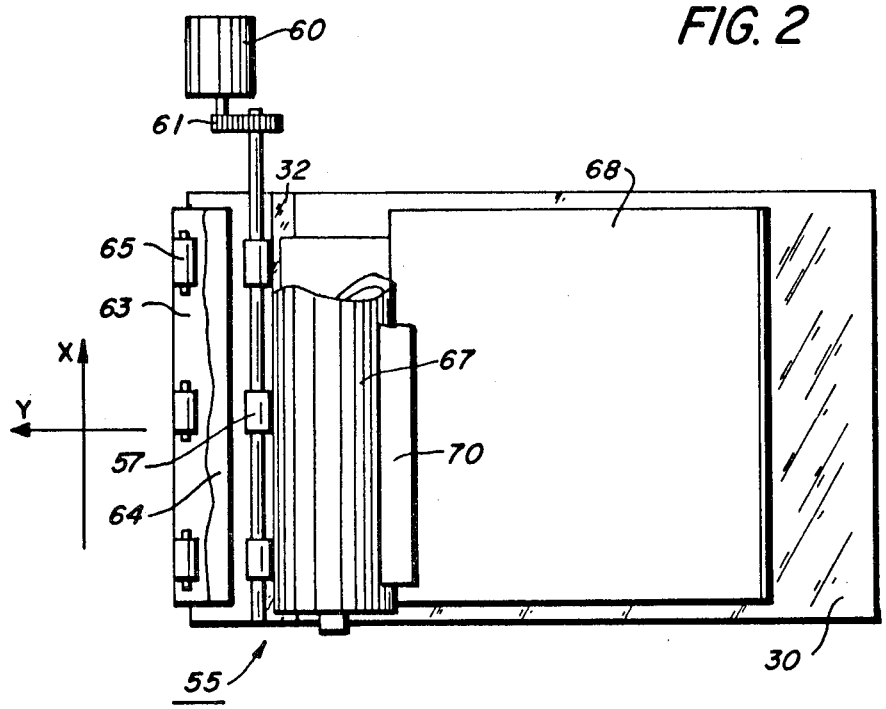
FIG. 2 is a top view in cross section of the scanner shown in FIG. 1.

Referring particulary to FIG. 1 of the drawings, there is shown the micro scanner apparatus 10 of the present invention. As will appear, scanner 10 is operable in either a stationary document or moving document scan mode to scan a document original 8 line by line to convert the document image to electrical signals or pixels. Scanner 10 includes a suitable frame 12 having a substantially flat base portion 13 on which one or more linear arrays 15 are suitably supported in fixed position. Arrays 15 may comprise any suitable scanning array such as a charge coupled device (C.C.D.). One suitable array is model No. 1728 C.C.D. manufactured by Fairchild Corporation.

As will be understood by those skilled in the art, more than one array 15 may be used, it being understood that additional arrays serve to increase image resolution. In the event several arrays 15 are used, the array viewing fields may be abutted or overlapped, either electronically or optically to prevent any gaps in the viewing field of the scanning apparatus 10. A suitable clock 16 is provided for operating the array 15 in a manner understood by those skilled in the art.

A suitable reduction lens 17 is supported above array 15 and in relatively close proximity thereto, lens 17 serving to focus the image rays reflected from the document 8 being scanned onto the array 15. As best seen in FIGS. 1 and 5, lens 17 is mounted in a block like structure, identified as lens block 19 herein, which in turn is fixedly attached to and supported by the armature shaft 22 of a linear type motor 23. Motor 23 is supported in stationary position on base 13 by means of rigid support members 25 such that the axis of shaft 222 is substantially parallel to base 13. A bearing block 27 provides further support for armature shaft 22, block 27 being secured to base 13 of frame 12. Suitable journal or bearing means (not shown) in block 27 permit reciprocating movement of armature shaft 22 in the direction shown by the solid line arrow of FIG. 1.

Linear motor 23 may comprise any suitable linear actuator, i.e. a voice coil, hydraulic cylinder, etc. Stops 29, 29' on armature shaft 22 cooperate with the motor housing and block 27 to limit reciprocating movement of armature shaft 22 and the scanning movement of lens 17 mounted thereon. As will appear, the scanning movement or stroke of lens 17 is relatively small.

A substantially planar platen 30 for supporting documents 8 to be scanned is mounted on frame 12 in preset spaced relationship to lens 17 and the scanning array 15. Platen 30, which is formed from any suitable transparent material such as glass serves in the scanning apparatus 10 as a support for both stationary and moving documents 8 as will appear. A slit-like scanning apeture 32 is provided in platen 30 adjacent one end thereof, aperture 32 extending in the cross scan direction across the width (W) of platen 30. As will be understood, the length (L) and width (W) dimensions of platen 30 and the width of scanning aperture 32 are sufficient to accommodate the largest size document 8 to be scanned.

Figure 3:
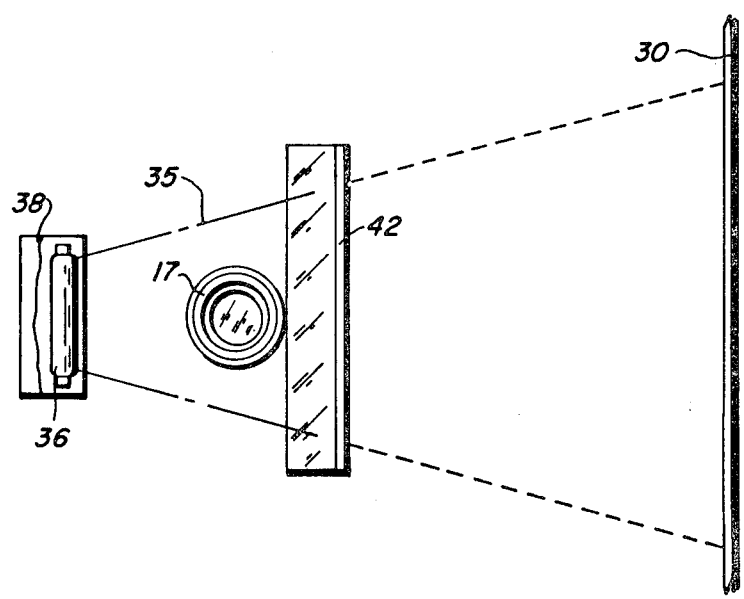
FIG. 3 is a view in the horizontal plane showing the scanning beam unfolded.
Figure 4:
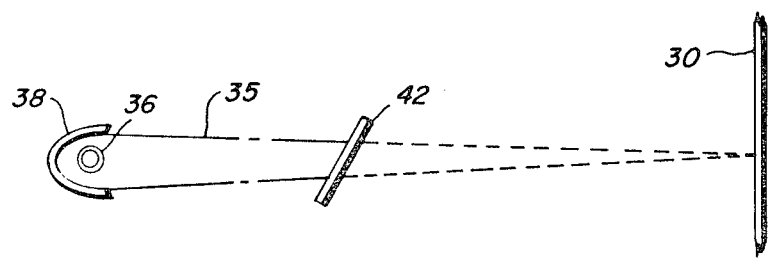
FIG. 4 is a view in the vertical plane showing the scanning beam unfolded.

To illuminate the document 8 to be scanned, a high intensity lamp 36 is provided, lamp 36 being suitably supported by member 26 on base 12. An elliptical reflector 38 cooperates with lamp 36 to direct a sheet or wedge-like beam 35 of light onto an oscillating sweep mirror 42 disposed in preset spaced relationship to the lamp mirror combination 36, 38, mirror 42 serving to reflect the light beam 35 onto platen 30. As best seen in FIGS. 3 and 4, the beam 35 of light emitted by lamp 36 and scanned across platen 30 by sweep mirror 42 diverges when viewed in the horizontal plane while when viewed in the vertical plane beam 35 converges at platen 30, the relative operating parameters and locations of the various components being chosen to assure a scanning beam whose width in the cross scan direction is at least equal to the width of the largest document to be scanned and whose thickness in the scan direction is at least equal to that of an image scanline. And while reflector 38 is shown as being elliptical in shape, other configurations such as parabolic may be envisioned.

For operation in the stationary document scan mode, mirror 42 is supported by an upwardly projecting arm pair 43 mounted for pivotal movement as by pins 44 on the extremities of lens block 19. In the embodiment shown, the axis of rotation of mirror 42 about pins 44 intersects the optical axis of lens 17. To impart the required oscillating movement to mirror 42, arms 43 are provided with suitably configured cam tracks 48, cam tracks 48 being engageable with cam element 49 mounted on cam support members 50. Cam support members 50 are in turn fixed to base 13 of frame 12. Accordingly, as armature shaft 22 reciprocates back and forth to move lens 17, engagement of cam tracks 48 wih cam element 49 cause mirror 42 to swing in a predetermined arc about the axis of pins 44 to sweep the beam of light emitted by lamp 36 across platen 30 to searchlight fashion. The scanning movement or stroke of light beam 35 is as will appear sufficient to scan the length (L) of the largest document 8 to be scanned and is substantially greater than the distance through which lens 17 is moved.

For operation in the moving document scan mode, a document transport 55 is provided. Document transport 55 includes a constant velocity transport (C.V.T. herein) roll 57 for moving a document across scanning aperture 32 at a predetermined scanning rate. C.V.T. roll 57 is suitably journaled for rotation in the document handler housing 58. Roll 57 is drivingly coupled to a scan motor 60 as by belt 61. A pair of arcuate return guides 63, 64 cooperate with one or more pinch roll pairs 65 to guide the document discharged by roll 57 to document return roll 67 and a document catch tray 68.

Document return roll 67, which is rotatably journaled in housing 58, and pinch roll pair 65 may be driven in the direction shown by the solid line arrows by a suitable drive motor such as scan motor 60. To maintain rolls 65, 67 operating for an interval following scanning of the last document line long enough to transport the scanned document into tray 68, a suitable timing control (not shown) may be provided for the roll driving motor. When operating in the moving document scan mode, the document to be scanned is inserted manually into the nip formed by CVT roll 57 and platen 30 at the start of scanner operation, opening 58' being provided in housing 58 for this purpose.

Figure 6:
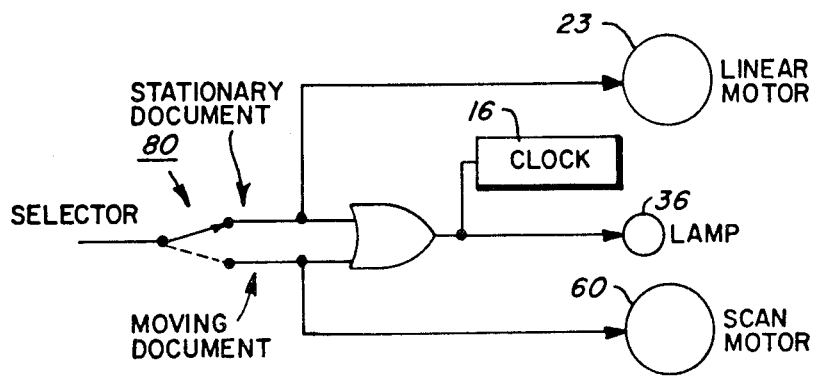
FIG. 6 is a logic schematic of the operating control system for the scanner shown in FIG. 1.

In this operational mode, lens 17 and sweep mirror 42 are parked in a predetermined position such that scanning aperture 32 is illuminated and focused on array 15, the park position being established through interengagement of motor shaft stop 29' with frame member 27.

Where operation in the moving document mode is desired, selector 80 is set to the dotted line position shown in FIG. 6. In this position, clock 16 and lamp 36 are readied for energization while linear motor 23 is held in a disabled state to maintain lens 17 and mirror 42 in the park or stationary position shown by the solid lines of FIG. 1. Additionally, scan motor 60 is readied for energization.

The document to be scanned is inserted into the nip formed by CVT roll 57 and platen 30 and, on a demand for image signals, clock 16, lamp 56, and scan motor 60 are energized. Energization of motor 60 operates CVT roll 50 to advance the document across scanning aperture 32 where the document is scanned line by line by array 15, pinch roll pair 65 and return roll 67 cooperating with document guides 63, 64 to transport the scanned document to catch tray 68.

Referring to FIG. 6, a suitable mode selector 80 is provided to permit the operator or user to select the operating mode of scanning apparatus 10, i.e. either the stationary or moving document scan mode. Where operation in the stationary document scan mode is desired, the document to be scanned may be manually placed on platen 30 and selector 80 set to the solid line position shown readying clock 16, linear motor 23, and lamp 36 for energization . On a demand for image signals, the signal in line 81 energizes clock 16, lamp 36 and linear motor 23, the latter moving lens 17 together with mirror 42 through a preset path at a predetermined scan rate. The swinging motion imparted to mirror 42 sweeps the beam of light output by lamp 36 across the platen 30 and the documented 8 thereon to illuminate the document line by line. The image rays reflected from document 8 as the beam of light sweeps thereacross are focused onto array 15 by lens 17, movement of lens 17 serving to maintain focus as the moving beam of light scans across platen 30.

Figure 7:
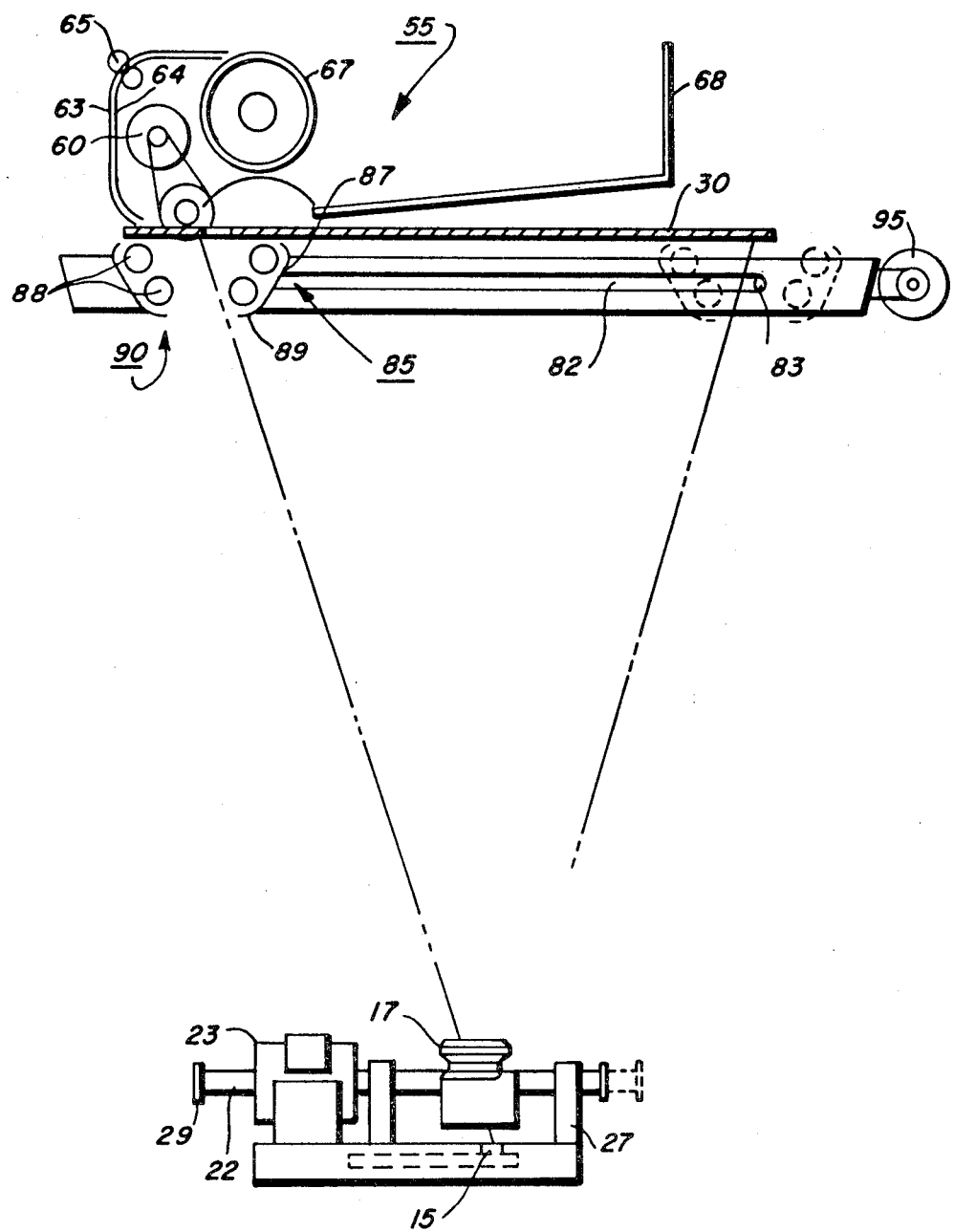
FIG. 7 is a side view in cross section showing an alternate micro scanner design.

In the embodiment shown in FIG. 7, where like numbers refer to like parts, a moving illumination cavity 85 is used in place of the searchlight mirror system shown in the FIGS. 1-6 embodiment. Illumination cavity 85 includes an elongated generally U-shaped reflector cavity 87 within which are disposed one or more high intensity lamps 88. The base portion 89 of cavity 87 has an enlongated scanning aperture 90 formed therein to permit image rays reflected from the document being scanned to pass therethrough to lens 17 and the array 15.

Illumination cavity 85 is supported for reciprocating movement in predetermined spaced relationship with and below platen 30 as by means of cooperating track and pin means 82, 83 on either side thereof. A suitable driving mechanism such as motor 95 is provided for moving illumination cavity 85 back and forth below platen 30.

Operation of the FIG. 5 embodiment is generally similar to that described heretofore in connection with the FIGS. 1-6 embodiment with the illumination cavity 85 being moved by motor 95 in synchronism with movement of lens 17 during operation in the stationary document scan mode. On completion of the scan cycle, motor 95 returns cavity 85 to the start of scan position shown. In the moving document scan mode, illumination cavity 85 is parked in a position opposite platen scanning aperture 32 while the document to be scanned is moved across platen 30 by document transport 55.

Figure 8:
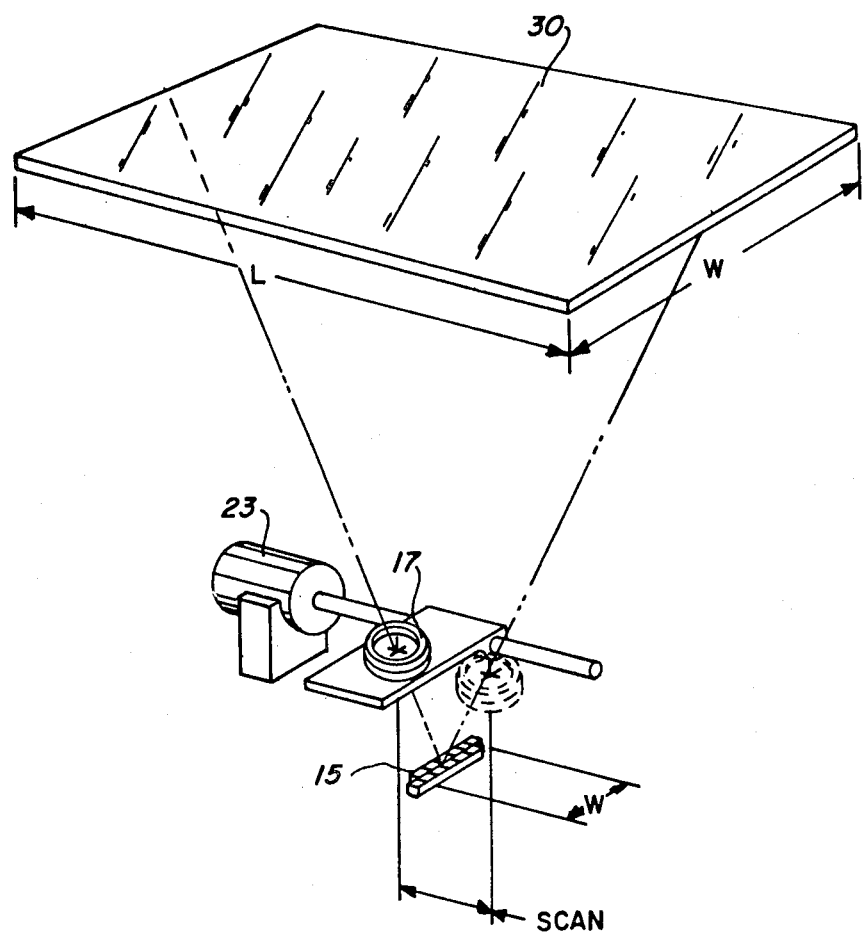
FIG. 8 is an isometric view showing an exemplary dimensional relationship between certain of the component parts of the scanner to provide micro-like scan movement of the scanner lens.

Referring particularly to FIG. 8 where like numbers refer to like parts, in one example, it was desired that scanner 10 be able to accommodate document sizes up to 14.33 inches to width (W) by 17 inches in length (L) using a linear array 15 having a width (W) of 1.128 inches. A reduction of 12.7:1 was chosen in order to focus document lines up to the aforesaid 14.33 inches onto the array 15 while keeping movement of lens 17 to a minimum. In that example, sweep mirror 42 scans beam 35 through a distance of 17 inches to accommodate the length (L) of the maximum size document while lens 17 is moved in synchronism with beam 35 through a distance of only 1.34 inches by linear motor 23. This achieves the desired reduction ratio of 12.7:1, and permits scanner 10 to handle relatively large size documents while keeping movement of lens 17 to a minimum.

In another example, a reduction of 13.229:1 was provided to accommodate document sizes up to 14.3 inches in width (W) by 10.12 inches in length (L) using a linear scanning array 15 having a width of 1.0809 inches. In this example, lens 17 is moved through a distance of 0.831 inches while beam 35 is scanned through a distance of 10.12 inches.

It is understood that the above are examples only and other dimensional relationships and reduction ratios may be contemplated in the light of the present invention.

It will be understood that whereas platen 30 together with document transport 55 is shown in a position above scanning system 14, other positional relationships i.e. where the respective positions of platen 30, ADH 55 and scanning system 14 are reversed, may be contemplated.

While the invention has been described with reference to the structure disclosed, it is not confined to the details set forth but is intended to cover such modifications or changes as may come within the scope of the following claims.

I claim:

1. A micro scanner comprising in combination:
    (a) a transport platen for supporting a document to be scanned;
    (b) means forming a wedge-like beam of light, the dimension of said light beam being at least equal to the width of said document in a cross scan direction;
    (c) means for scanning said light beam along said platen in a scan direction substantially perpendicular to said cross scan direction to illuminate the document on said platen line by line, the scan distance through which said light beam is moved being at least equal to the length of said document in the scan direction;
    (d) at least one linear scanning array; said array being stationary;
    (e) a lens interposed between said platen and said array for focusing document lines onto said array as said lines are illuminated by said light beam, said lens being positioned closely adjacent said array; and
    (f) drive means for moving said lens in synchronism with said light beam, said drive means moving said lens at a fraction of the distance through which said light beam is moved whereby to maintain said document lines in focus with said array as said light beam is moved through said scan distance with only micro-like movement of said lens.

2. The scanner according to claim 1 in which said light forming means comprises a stationary light source; said scanning means including a movable mirror for intercepting the light beam from said light source and reflecting said light beam toward said platen, said drive means moving said mirror through a predetermined arc in synchronism with movement of said lens whereby upon actuation of said drive means, said mirror sweeps said light beam along said platen to progressively illuminate said document.

3. The scanner according to claim 2 in which said platen includes a scan slit for viewing a line-like portion of a document on said platen, said scan slit extending in said cross scan direction; and document transport means for moving a document to be scanned across said platen and said scan slit in said scan direction;

said drive means placing said mirror and lens in a preset scan position whereby said light beam illuminates said scan slit and said document portion thereover while said lens focuses said scan aperture and said illuminated document portion onto said array.

4. The scanner according to claim 1 in which said light forming means includes a diffuse reflecting cavity spaced opposite said platen to reflect light toward said platen, and lamp means in said cavity; said cavity and said lamp means extending in said cross scan direction and cooperating to provide said wedge-like beam of light for illuminating said platen and the document thereon; and drive means for moving said cavity in said scan direction in synchronism with said lens to progressively illuminate said platen and the document thereon.

5. The scanner according to claim 4 in which said platen includes a scan slit for viewing a line-like portion of a document on said platen, said scan slit extending in said cross scan direction; and document transport means for moving a document to be scanned across said platen and said scan slit in said scan direction;

said drive means placing said cavity and said lens in a preset fixed scan position whereby said light beam from said cavity illuminates said scan slit and the document portion thereover while said lens focuses said scan aperture and the illuminated document portion onto said array so that said array scans said document line by line as said document is moved across said scan slit by said document transport means.

6. Scanning apparatus comprising:
(a) a transparent platen for supporting documents to be scanned;
(b) at least one linear scanning array, said array being stationary;
(c) optical means for conveying image rays from said document onto said array;
(d) means for sweeping a wedge-like beam of light across said platen to progressively illuminate said platen and any document thereon including
a stationary source for said beam of light, and
a movable mirror for intercepting said beam of light from said source and reflecting said beam of light toward said platen; and
(e) drive means for moving said optical means and said mirror to sweep said beam of light across said platen to progressively illuminate said platen and any document thereon and convey image rays from said document to said array,
said drive means moving said optical means in synchronism with said mirror at a fraction of the rate at which said mirror is moved.

7. The scanning apparatus according to claim 6 in which said light sweeping means includes means supporting said mirror for pivotal movement about an axis intersecting the optical axis of said optical means.

8. The scanning apparatus according to claim 6 including document feeder means for feeding a document to be scanned across said platen, and means for holding said mirror and said optical means in a preset parked position on actuation of said document feeder means whereby said document is progressively illuminated by said beam of light and image rays therefrom are transmitted to said array as the document is fed across said platen.

9. The scanning apparatus according to claim 8 in which said document feeder means is disposed below said mirror and said optical means.

10. A raster input scanner comprising:
(a) a transparent platen for supporting documents to be scanned;
(b) lamp means movable across the length of said platen to progressively illuminate the document thereon during scanning;
(c) lamp drive means for moving said lamp means;
(d) a linear scanning array, said array being stationary;
(e) a lens interposed between said platen and said array for focusing image lines from said document onto said array; and
(f) drive means for moving said lens in synchronism with said lamp means at a fraction of the rate at which said lamp means is moved, the fractional rate at which said lens is moved being proportional to the reduction ratio between said platen and said array.

11. The scanner according to claim 10 including transport means for moving a document to be scanned across said platen, and means for parking said lamp means and said lens in a preset position in response to actuation of said transport means whereby to scan the document as said document is moved across said platen by said transport means.

12. The scanner according to claim 10 in which said lamps means includes a diffuse cavity supported opposite said platen for reciprocating movement across the length of said platen, and at least one lamp in said cavity.

* * * * *